Nov. 18, 1947.   R. BOISSONNAULT   2,430,973
VEHICULAR LOAD-CARRIER AND COLLECTOR
Filed July 16, 1945   7 Sheets-Sheet 1

Inventor
Ronaldo Boissonnault
By Robic & Bastien
Attorneys

Nov. 18, 1947.  R. BOISSONNAULT  2,430,973
VEHICULAR LOAD-CARRIER AND COLLECTOR
Filed July 16, 1945  7 Sheets-Sheet 2

Inventor
Ronaldo Boissonnault
By Robic & Bastien
Attorneys

Fig. 4

Patented Nov. 18, 1947

2,430,973

UNITED STATES PATENT OFFICE 2,430,973

VEHICULAR LOAD CARRIER AND COLLECTOR

Ronaldo Boissonnault, Montreal, Quebec, Canada, assignor to Arthur Sicard, Montreal, Quebec, Canada Application July 16, 1945, Serial No. 605,216

5 Claims. (Cl. 214—67)

The present invention relates to a vehicular carrier and, more particularly, such a carrier having means for collecting a load, pressing said load and expelling same.

The primary object of the invention resides in the provision of improved means for loading a carrier in an efficient, simple and rapid manner.

Another object is the provision of a carrier of the character described, having loading means capable of compressing each load portion for volume-reducing purposes.

A further object envisages a carrier and collector of the type defined, which embodies means for bodily and forcibly expelling the load therein.

Still another object contemplates a load-collecting carrier which is rugged, foolproof, simple and relatively easy to manufacture at moderate cost.

Other objects and advantages of the invention will become apparent, or be pointed out further during the description to follow.

As an example, and for purposes of illustration, an embodiment of the invention is shown in the annexed drawings, wherein—

Before taking up the detailed disclosure of the carrier according to the invention, a short description thereof will be given to point out the novel characteristic features and to facilitate further comprehension of the mechanisms involved.

As is common to many refuse, or garbage, collectors, the present carrier is a closable container having means for loading the same from a single point, namely: a trough disposed at the rear of the enclosure. In said trough a loading panel is arcuately movable to gather the material disposed therein and lift the same into the carrier enclosure above.

As a novel feature of the invention, there is disposed, between the enclosure proper and the loading panel, an oscillatable trap door which is lowerable to close completely the aperture through which the material is forced by the panel. The said door has two functions when lowered: First to act as a wall against which the material can be compressed by the panel, so as to crush any compressible bodies present in the material, such as boxes, cans, bottles and the like. Second, to retain in the enclosure all material loaded therein from the trough, leaving the panel free to complete another cycle of material gathering (see Figs. 2, 8, 9 and 10).

The back of the carrier, including trough and all loading and compressing mechanisms, is hinged at the top and adapted to be swung open for load-discharging purposes. In addition to this known feature, however, the present carrier embodies means for forcibly expelling the load from the enclosure, without tilting the carrier. Said means are comprised of a sectional partition hinged so as to assume a position retracted within the enclosure, or a position extended across the mouth of said enclosure while, at the same time, lifting the back end of the carrier for emptying purposes.

As is conventional in much vehicular equipment, hydraulic pressure is used in the present device for actuating the mechanisms already mentioned. Such hydraulic pressure may be created by a pump driven by a power take-off from the vehicle transmission, as usual. Consequently, said pump and hydraulic lines, valves, etc., are well known, do not form part of this invention and are not shown nor described.

With the general description above in view, a more detailed explanation of the component mechanisms will now be given, with reference to the accompanying drawings, wherein all similar reference characters represent corresponding parts throughout.

Figure 1:
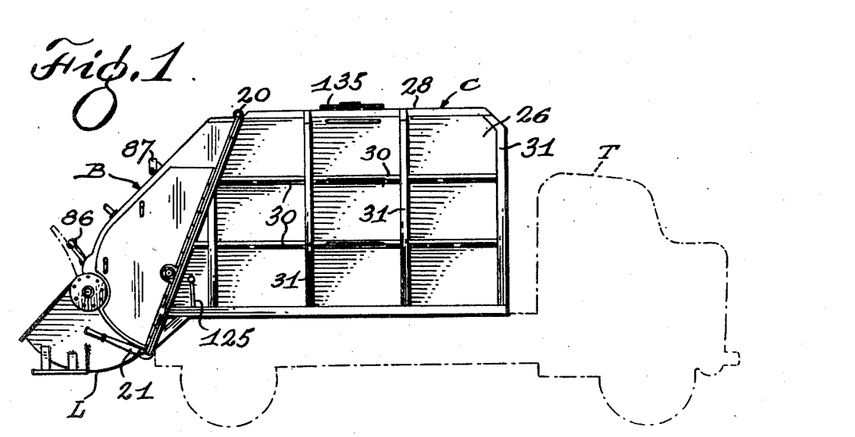
Figure 1 is a side elevational view of the carrier in relation with the motor vehicle thereof shown in dotted lines.

In Figure 1, the carrier of the invention is shown mounted over the chassis of a truck T shown in dotted lines; said carrier is essentially composed of two main outer parts, namely: the storage compartment C and the back casing B hinged to C at 20 and carrying at the bottom thereof the loading trough L. It will be noted that the compartment and casing meet together along a line inclined with respect to the vertical; the weight of the casing, therefore, tends to keep the same in contact with the compartment at all times, said casing being additionally held in place by a lever catch 21 pivoted to the casing and engaging the bottom flange of the compartment.

The compartment proper is an enclosure having floor 25, sides 26 and 27, a top 28 and a partial front end panel 29. The mouth, or rear end, of the enclosure is open, inclined as previously noted, and the edge thereof formed with a reinforcing contact flange 32, as shown clearly in Fig. 3. For the purposes of rigidity, side stiffening ribs 30 and braces 31 are provided on the outer walls of the enclosure.

The back B is a casing having wedge-shaped side plates 35 arcuately cut at the bottom to form the sides of the trough L; a back plate 36 is welded to the sides 35 and extends laterally beyond the same to the width of the compartment proper, so as to provide a space on both sides of the plates 35 to house the loading and crushing mechanism. Another curved bottom plate 37 forms the bottom of the trough.

Figures 13, 14, 15:
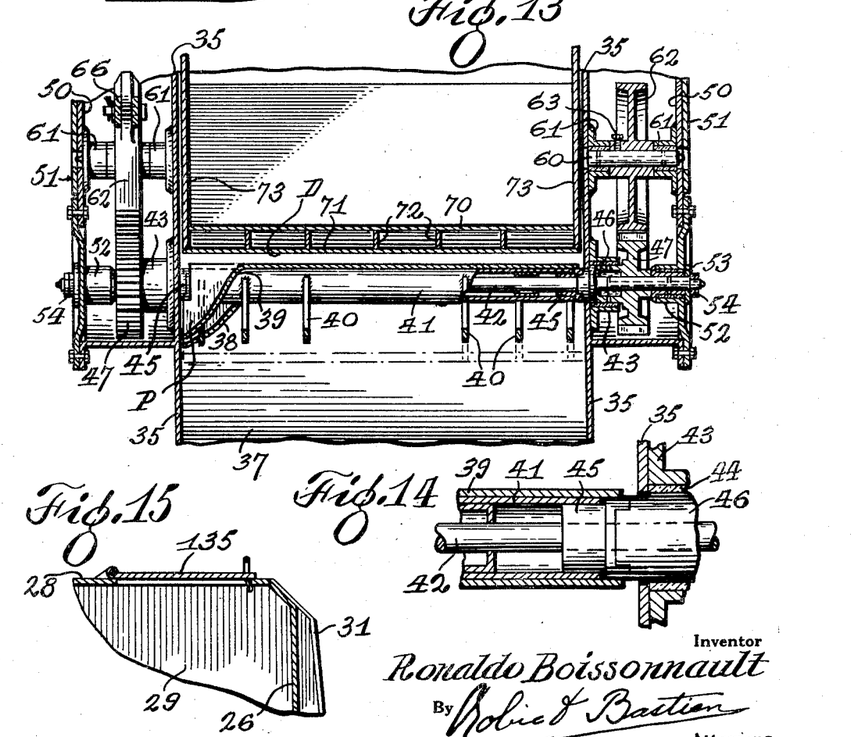
Figure 13 is part sectional view of the loading panel operating mechanism taken on line 13—13 of Fig. 12, on the right hand side of the carrier, the left hand side being shown as a plan view taken above said mechanism.
Figure 14 is an enlarged detail view of the loading panel at the right hand end thereof shown in section in Fig. 13.
Figure 15 is a detail view of an inspection cover on the top of the carrier.

At the upper end of the trough there is disposed a loading panel P comprised of a pair of curved sheets 38—39 welded and braced together at 40 to form a rigid unit (see Fig. 13). This panel is secured at its upper end to a tube 41 which, in turn, is concentrically supported over a shaft 42 extending through said tube and projecting outwardly beyond both the plates 35 through flanged collars 43 welded to said plates and acting as boxes for the bearing 44.

Therefore, the loading panel, as a whole, is freely mounted over the shaft which acts only as a support; the driving means for the panel consist of a splined bushing 45 welded, or otherwise secured to the pivot end of said panel and concentric with the shaft and tube. The splined bushing is engaged by the splined shank 46 of a pinion 47 journalled on the projecting end of the shaft.

Figure 2:
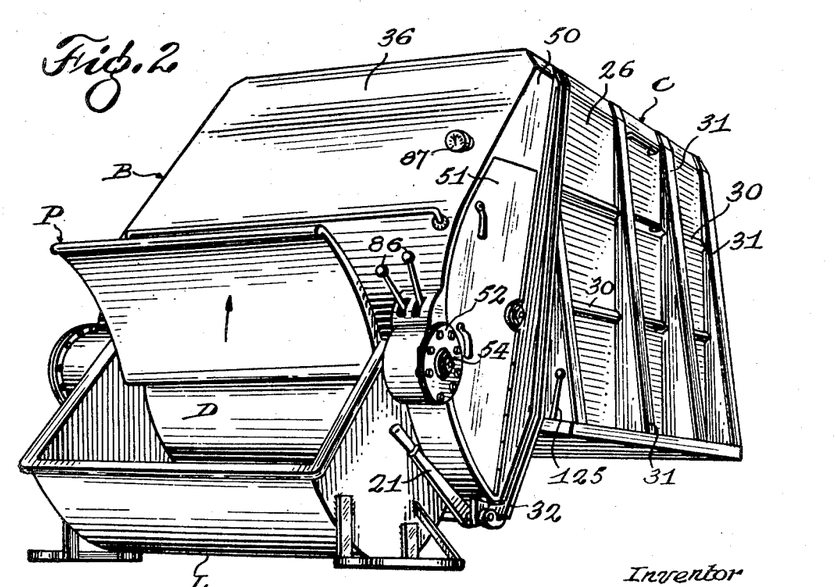
Figure 2 is a perspective view, from the loading, or back, end of the carrier proper.
Figure 3:
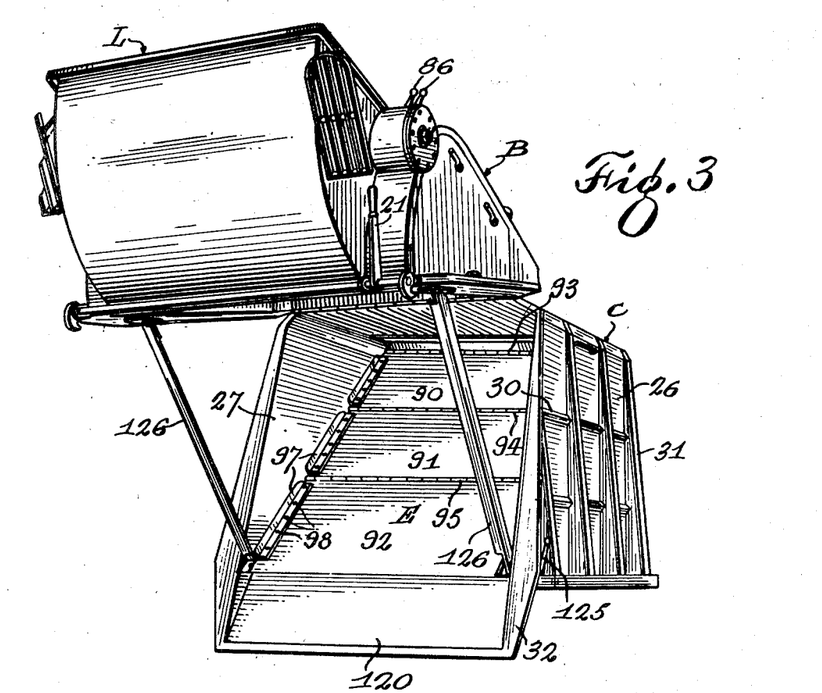
Figure 3 is a view similar to Fig. 2, showing the carrier in load-expelling position.

As shown to advantage in Figures 2, 3 and 13, an outer wall 50 is provided parallel to the plates 35, which wall acts as a support for carrying, in conjunction with said plates, the mechanism disposed in the enclosure defined between said plates and wall; a hinged door 51 gives access to the enclosure.

In an aperture of this outer wall 50, concentric with the shaft 42, a flanged collar 52 is bolted to act as a bearing for a sleeve 53 mounted on the shaft and acting as a retainer for the pinion 47, which sleeve is held over the shaft by lock nuts or the like 54. Thus, the shaft 42 is held as described to act as a support for the loading panel and the pinion 47; longitudinal movement of the shaft is obviously prevented by the locknut at both ends thereof.

Substantially the same construction is obtained for supporting a second stub shaft 60 between the plates 35 and outer wall 50 by means of the flanged collars 61. Onto said shaft, a segment gear 62 is mounted and held in place by the set screw 63. As shown to advantage in Figure 12, the segment gear 62 has a crank extension 65 which is pivoted to the piston stem 66 of a cylinder 67. Inasmuch as the gears 47 and 62 mesh together, the longitudinal movement of the piston stem 66 will transform the longitudinal movement of said stem into a rotary movement applied to the top of the loading panel P and cause the same to oscillate around its pivot. Since said panel is adapted to fit snugly within the loading trough L and scrape slightly the sides and bottom thereof, it is evident that any material loaded in said trough will be displaced by the panel towards the inside of the compartment C.

The aperture through which the material conveyed by the loading panel enters the back of the compartment C is comprised between the pivoted end of the loading panel P and the inner end of the trough bottom; obviously, said aperture is limited also by the sides of the trough which are the continuation of the plates 35 already described. As stated previously, this loading aperture is adapted to be closed by a trap door D, which consists of a segment-like casing having rear backing plates 70 and a front convex plate 71, both of which are held together by means of the reinforcing ribs 72 (see Figure 13). This casing is welded or otherwise secured to the outer end of sectors 73 right angularly disposed with respect to the longitudinal axis of this casing, and secured at their apexes to pin 75 shown in Figure 16.

As shown to advantage in Figure 13, the sectors 73 are in close contact with the plates 35 and almost scrape thereagainst to prevent entry therebetween of foreign material. Furthermore, as clearly illustrated in Figures 8 to 10 inclusive, the curvature of the front plate 71 is calculated to correspond exactly to the curvature of the loading panel plate 38 as well as the curved portion 76 of the back plate 36 adjacent the pivoted end of the loading panel.

The means for actuating the trap door from a position above the loading aperture (Fig. 9) to a position completely closing the same (Figs. 8 and 10) consist of the pin 75 already referred to, mounted between 35 and 50 in bearings 77. A crank arm 78 is keyed at one end to the center of the pin 75 and the outer end of said arm pivoted to the piston stem 79 of an hydraulic cylinder 80. Consequently, according to the movement of the piston in the cylinder 80, the trap door may be actuated to occupy the position shown in the figures above referred to.

Figure 11:
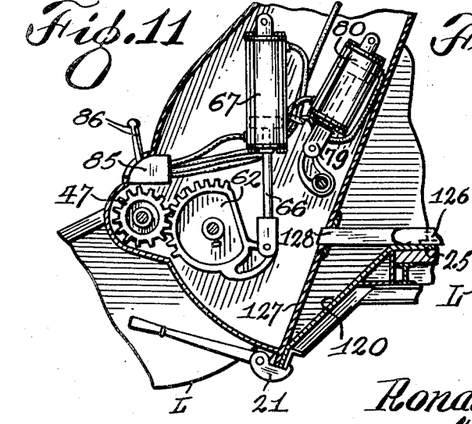
Figure 11 is a side partial view of hydraulic cylinders actuating the loading panel and trap door and in position corresponding to Figure 9.
Figure 12:
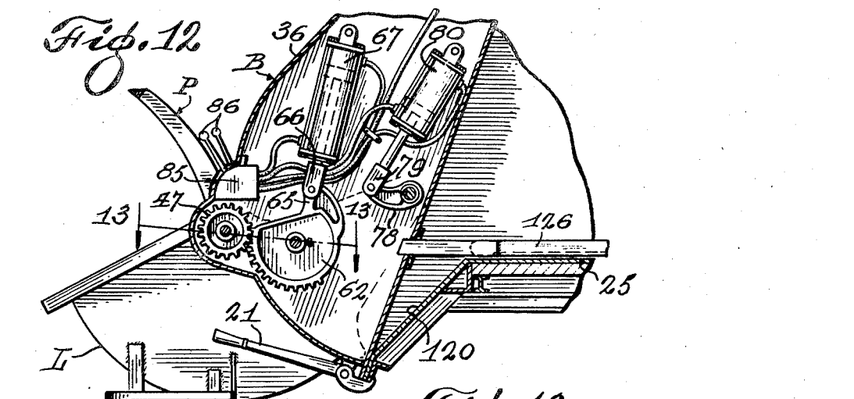
Figure 12 is a similar view of the cylinders corresponding to the position of the loading elements in Fig. 5.

The pistons in cylinders 67 and 80 are hydraulically actuated, as previously disclosed, the hydraulic pressure being applicable selectively on each side of said pistons by means of the hydraulic lines shown more particularly in Figures 11 and 12 and leading to a valve-box 85 from which levers 86 project and which operate suitable valves for reversing the action of the said pistons. Thus, both the loading panel P and the trap door D can be operated at will from the outside of the carrier. A pressure gauge 87 indicates the pressure in said lines and serves as an indication of the position of said elements when a maximum pressure is reached.

Figure 4:
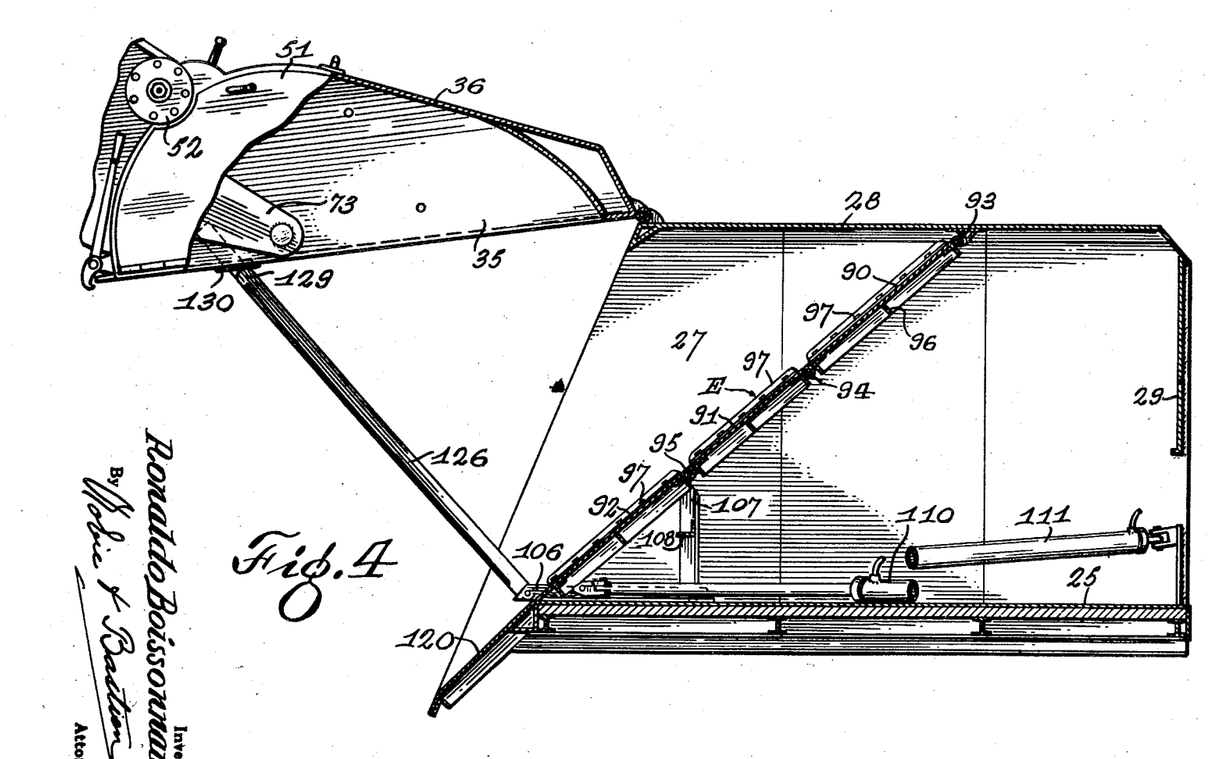
Figure 4 is a longitudinal vertical section of the carrier in the position shown in Fig. 3.
Figures 5, 16:
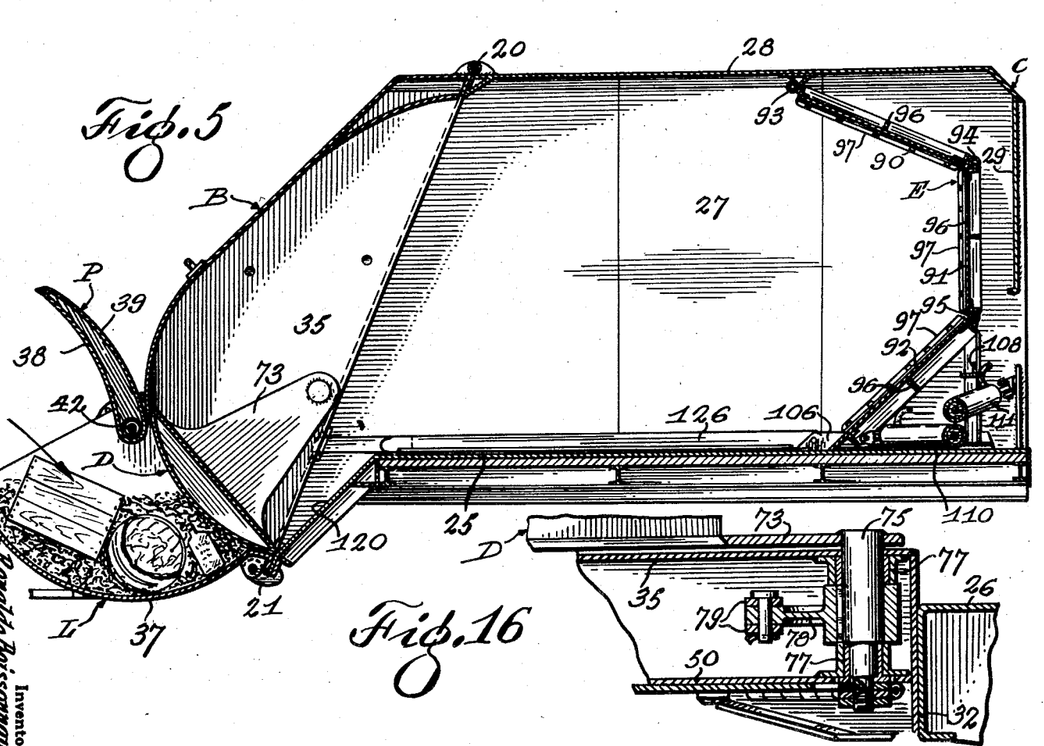
Figure 5 is a longitudinal vertical section through the carrier in load-receiving position.
Figure 16 is an axial sectional view taken through the trap door pivoting means.
Figure 17:
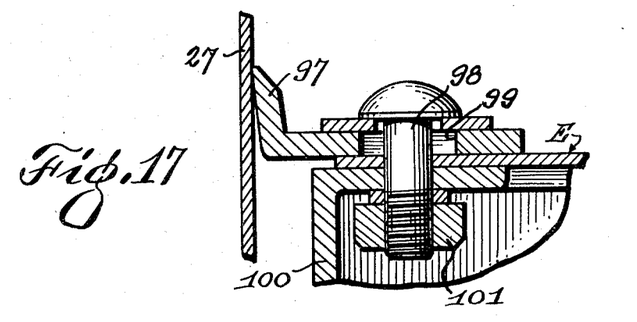
Figure 17 is a transverse section through the carrier wall-scraping means of the load-expelling means.

The load expelling means already mentioned are shown more particularly in Figures 3, 4 and 5 and consist essentially of an inside partition generally indicated by the reference letter E. Said partition is a composite affair comprised of three panels 90, 91 and 92 which are adapted to occupy an out-of-the-way position as shown in Figure 5, and a load-expelling position shown in Figures 3 and 4. The upper panel 90 is hinged to the top 28 of the carrier at 93 and in turn hinged to the adjacent panel 91 at 94. This last panel 91 is similarly hinged at 95 to the lower panel 92. Each of said panels is formed of a suitable metallic plate braced at the back by means of the ribs 96 and provided on the sides with a scraper blade 97 adjustably secured to the outer edge of each panel by a bolt 98 passed through a slot 99 of the scraper, the outer edge of the panel and an edge reinforcing angle bar 100. A nut 101 serves to clamp the scraper in position (see Figure 17).

The lower panel is provided at the back thereof with a runner 105 arranged at each side thereof and extending slightly to the front of said panel as at 106. The rear end of the runner is connected to the upper end of the panel 92 by means of an upstanding post 107, the posts at both sides of the panels being braced together by the tie-bar 108. Thus, the said panel is held always in a constantly inclined position and adapted to slide over the floor 25 of the carrier by the frame-like supporting structure just described at the back thereof.

Figure 6:
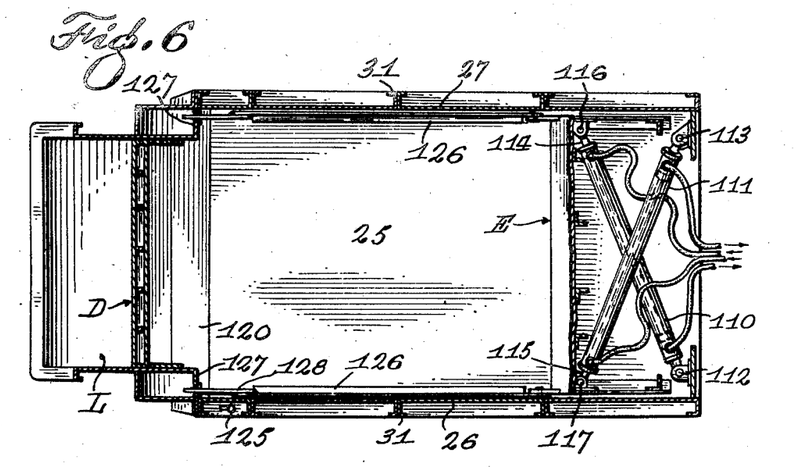
Figure 6 is a longitudinal horizontal section through the carrier showing the load-expelling cylinders in retracted position.
Figure 7:
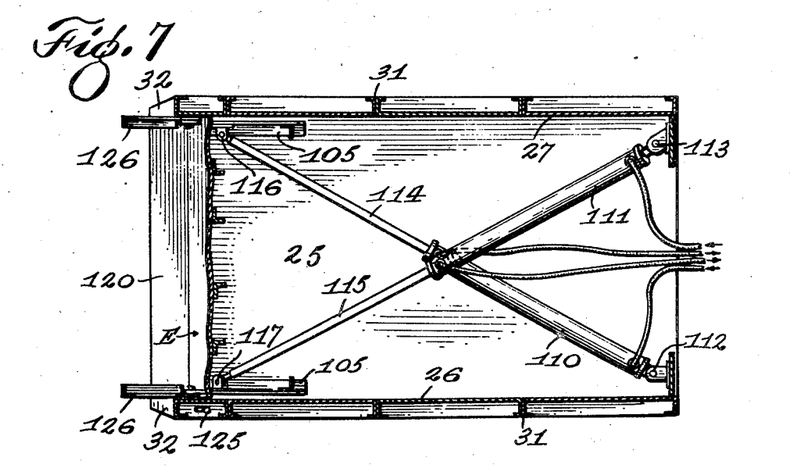
Figure 7 is a similar view with the said cylinders in extended position.

The said lower panel is moved forward or backward inside of the carrier by means of the crossed-cylinders 110—111 shown in plan view in Figures 6 and 7 and which cylinders are pivoted to the front of the carrier at 112 and 113 respectively. The rods 114 and 115 attached to suitable pistons inside the cylinders and extending out of the cylinders 110 and 111 are pivotally secured at 116 and 117 onto the runners 105 already described, at a point thereof immediately underneath the lower end of the panel 92. Consequently, as the piston rods are extended from or retracted within the cylinders, the runners 105 will be advanced from the front of the carrier to the back thereof immediately adjacent to and in line with the apron 120 disposed below the mouth of the compartment C. Obviously, since the panels are hinged together, the longitudinal movement of the lower panel just described will operate to deform the partition E as a whole from the inoperative position of Fig. 5 to that of Figure 4 which is the active load expelling position.

The hydraulic fluid under pressure for actuating the cylinders 110 and 111 can be taken from the same source as that feeding the other cylinders described, and admitted before or behind the pistons in said cylinders by means of the flexible tubing shown in Figures 6 and 7 and controlled by means of a suitable valve actuatable by the lever 125 disposed on the sides of the compartment and shown in Figures 1, 2, 3, 6 and 7.

The pivoted back B of the carrier is swung upwardly, as shown in Figure 3, for purposes of load-expelling, by means of a pair of push-bars 126, consisting of angle iron, each of which is pivoted at one end to the extension 106 of the runners 105 and the other end of which enters an aperture formed in the lower end of the back seat flange 127, as shown clearly in Figures 4, 5, 6, 11 and 12. The end of the push-bars penetrating the flange 127 is an extension bar 128 welded to the angle bar 126 and acting as a guide for said bar. The end of the bar 126 is rounded as at 129 (see Fig. 4) so as to contact the side of a hardened thrust plate 130 against which the said portion 129 abuts for raising the pivoted back. Consequently, the backward movement of the runners 105 shall cause the push-bars 126 to raise the pivoted back to the extreme position shown in Figures 3 and 4 for unloading purposes.

Figures 8, 9:
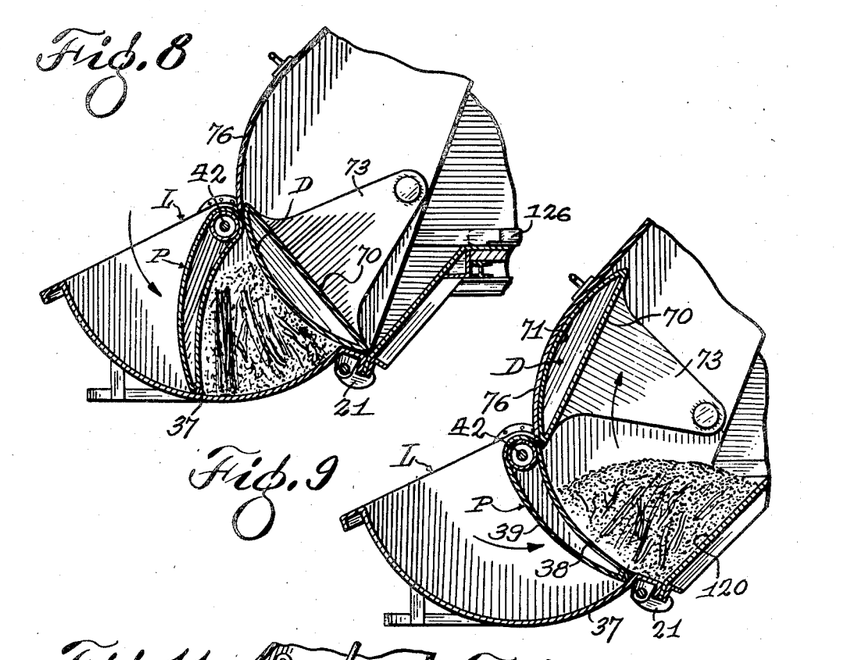
Figure 8 is a vertical section through the loading end of the carrier, showing a load being compressed between a loading panel and a trap door.
Figure 9 is a similar view, showing the compressed load being lifted by the loading panel past the trap door into the carrier.
Figure 10:
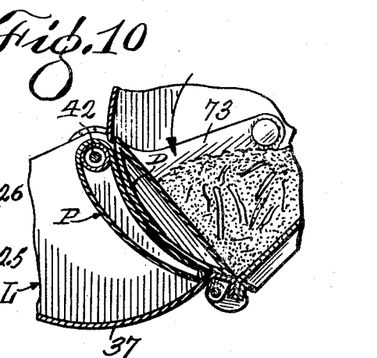
Figure 10 is another view showing the trap door lowered behind the lifted load to retain the same inside the carrier.

The operation of the collector according to the invention should be obvious from the various figures and more particularly Figure 5 showing the apparatus in position for receiving its first load, Figure 3 showing the apparatus unloaded and Figures 8 to 10 depicting the various stages of loading the compartment.

The empty compartment C is shown in Figure 5 wherein it will be seen that the partition E is retracted to the front thereof so as to provide for the greatest possible receiving space inside said compartment. It is assumed, also, that the pivoted back is properly locked by means of the lever catch 21. In this position, the push-bars 126 will rest on the floor 25 of the compartment, and the extension 128 just engaged with the flange 127, at the limit of its possible retraction therefrom.

Figure 5 shows the first stage for loading the compartment and which consists in lowering the trap door D to close the passage between the loading trough L and the compartment proper. Refuse is accordingly loaded into the trough, said refuse including collapsible or compressible material such as boxes, crates and the like. After the trough has been filled, one of the levers 86 is manipulated to lower the panel P on top of said refuse and, as the pressure thereof against the material is increased, thereby causes crushing of the compressible material against the outer convex surface of the trap door. This crushing action may be continued until the pressure gauge 87 indicates that the maximum pressure is reached, and the movement of the panel P consequently stopped. Thereafter, manipulation of the remaining lever 86 will cause lifting or raising of the trap door D to the position shown in Figure 9, and movement of the panel P may be resumed until it reaches the position shown in said Figure 9.

The operation described so far has been illustrated consecutively in Figures 5, 8 and 9. The next step is that shown in Figure 10 wherein the trap door D has been lowered to scrape from the concave surface of the loading panel the refuse resting thereon and to transfer the same into the compartment proper, as shown in Fig. 10. In this position, the trap door acts to retain in the compartment the material transferred therein, thereby freeing the loading panel to return in the original loading position shown in Figure 5.

After a certain number of the operating cycles described above have been completed, it is evident that the compartment C will become filled: consequently, the last load to be charged in the compartment will require correspondingly more power. The conditions of filling in said compartment can be visualized by means of the inspection trap or panel 135 provided in the top 28 of the compartment, as shown in Figure 15.

The load expelling operation should be obvious from the foregoing description of this mechanism: when the compartment is completely filled, the position of the partition E will, in that case, affect the position shown in Figure 5. On actuating the lever 125, fluid under pressure will cause the rods 114 and 115 to be extended out of the cylinders 110 and 111 until the position of the partition shown in Figures 4 and 5 has been reached. It is evident that when the partition occupies the position of Figure 4, most of the load will have been already expelled and whatever remains on the inclined surface can be easily raked on by the carrier attendant. Also, as already described, the swinging back B will have reached the position of Figures 3 and 4, so as to open the mouth of the compartment for refuse evacuation therefrom.

From the foregoing description, it should be evident that the present invention is an advance in the art of refuse or garbage collectors in that means are provided for compressing the same prior to its entry into a storage compartment, said compartment furthermore having means for forcibly expelling the load forced therein.

It must be understood that various changes as to the size, shape and arrangement of parts may be resorted to without departing from the spirit of the invention or the scope of the subjoined claims.

Having thus described my invention, I claim:

1. In means of the character described, in combination with a storage compartment, a receiving trough having a communication passage with the compartment, an arcuately movable loading panel pivoted at the top of said trough to sweep material therein towards the passage, a trap door pivotally mounted for arcuate movement in said passage, and means for selectively actuating said panel and door, whereby the door may be lowered to close the passage for compressing thereagainst material swept by the panel prior to being loaded into the compartment.

2. In a load-collecting carrier, a compartment, a loading trough at one end of said compartment, a loading panel pivoted at one end and arcuately movable in the trough to sweep material therein into the compartment, a trap door adapted to close the compartment end of the trough so that material propelled by the panel is crushed thereagainst and retained in the compartment after it has been swept therein, and means for selectively actuating the panel and door, including a source of motive power therefor.

3. A garbage collector comprising a wheeled compartment open at one end to form a mouth, a hinged back covering said mouth, a loading trough in the back having communication with the compartment, a swinging panel mounted for arcuate movement in the trough, said panel being adapted to sweep material loaded therein into the compartment, a trap door movable to close the communication between trough and compartment, whereby said panel may compress thereagainst all crushable components of the material swept, means for selectively actuating the panel and door, and means for expelling the material loaded in the compartment and raising the hinged back to uncover the compartment mouth.

4. In a refuse-collecting carrier, a storage compartment open at one end and closed at the other, said compartment being quadrangular in cross-section and having its open end inclined from the horizontal, a back casing hinged at the top of the compartment for closing the open end, a sector-shaped trough at the lower part of the back casing and opening into the compartment, a loading panel pivoted at the apex of the trough adapted to sweep into the compartment refuse placed in the trough, a swinging trap door movable arcuately across the panel path to form a wall against which the refuse is crushed by the panel, and means for actuating the panel and door.

5. In a carrier as claimed in claim 12, a deformable sectional partition hinged at one end to the top of the compartment at the closed end thereof and at its free end to runners slidable on the bottom of the compartment, an arm pivoted to each runner and engaging the lower end of the back casing and a pair of crossed extensible members for actuating the runners from a position adjacent the closed end of the compartment to a position near the lower edge of the open end and also extending the arms outwardly to raise the back casing from a closed to an open position.

RONALDO BOISSONNAULT.

REFERENCES CITED

The following references are of record in the file of this patent:

UNITED STATES PATENTS

| Number | Name | Date |
| --- | --- | --- |
| 1,908,899 | Kayel | May 16, 1933 |
| 2,263,199 | Wachter et al. | Nov. 18, 1941 |
| 2,298,747 | Agar | Oct. 13, 1942 |
| 2,299,368 | Wood | Oct. 20, 1942 |
| 2,335,155 | Lee | Nov. 23, 1943 |
| 2,371,540 | Mott | Mar. 13, 1945 |